United States Patent Office 3,172,886
Patented Mar. 9, 1965

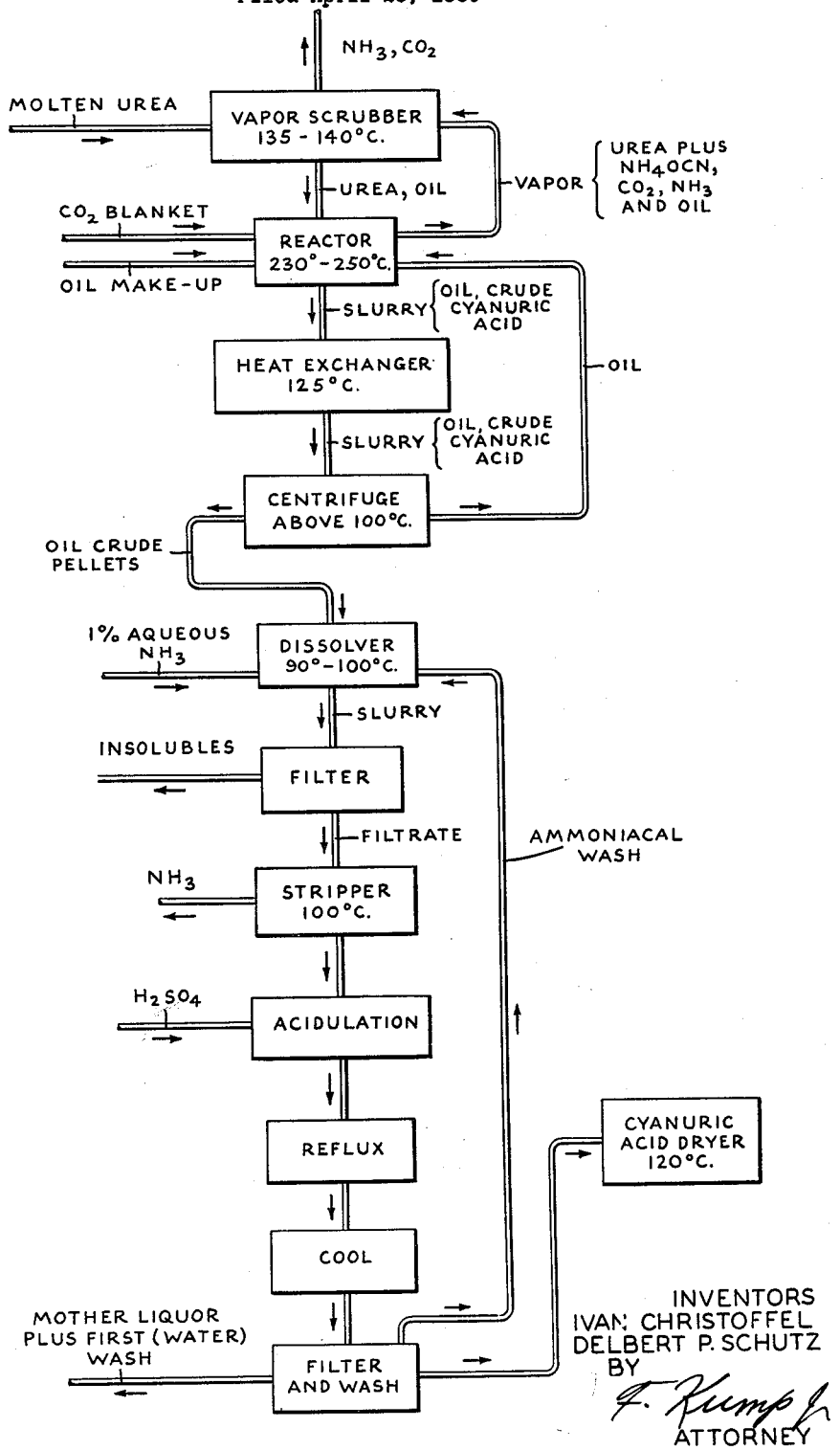

3,172,886
PRODUCTION OF CYANURIC ACID FROM UREA
Ivan Christoffel and Delbert P. Schutz, Hopewell, Va., assignors to Allied Chemical Corporation, New York, N.Y., a corporation of New York
Filed Apr. 28, 1960, Ser. No. 25,379
5 Claims. (Cl. 260—248)

This invention relates to the production of cyanuric acid. More particularly, it relates to a method of preparing cyanuric acid by pyrolysis of urea in an inert liquid medium.

Numerous processes have been developed for preparing cyanuric acid by pyrolysis of urea suspended in an inert liquid medium. These processes of the prior art have, however, been handicapped by numerous problems, one of which is the caking of the product on the apparatus which reduces the yield of the product and interferes with the recovery of the material from the liquid medium in which it is suspended. Furthermore, the methods of the prior art lead to a product which it is difficult to separate from all traces of oil or other impurities. Such products cannot be used in the production of trichloroisocyanuric acid which is the active component of dry bleach compositions for which cyanuric acid is an important intermediate.

It is accordingly an object of this invention to provide a process for the preparation of cyanuric acid from urea in a manner in which caking is prevented.

It is a further object of this invention to provide a process which will yield a product which can readily be separated from the liquid medium in which it is suspended with the minimum retention of liquid.

It is a further object of this invention to provide a process for preparing a product in an economical manner such that no expensive pressure equipment is required.

It is a still further object of this invention to prepare cyanuric acid from urea in a manner which will lend itself to the formation of a highly purified product susceptible of use in the production of trichloroisocyanuric acid.

We have found that these objects and other advantages incidental thereto can be attained in the pyrolysis of urea in an inert liquid medium provided: (1) the medium at all times contains about 0.5 to 1.5 parts by weight of cyanuric acid particles per part by weight of liquid medium; (2) the mixture is agitated so that the cyanuric particles are maintained as a slurry; and (3) the slurry is maintained at a temperature between about 200° and about 300° C.

A typical flow sheet for the process is shown in the drawing. In our process particularly shown in the flow sheet, the urea is pyrolyzed by feeding it to a pool of the cyanuric acid slurry in inert liquid medium such as liquid high boiling hydrocarbon, e.g. paraffin oil, mineral oil, wax etc.; the pool being at about 230°–250° C. The resulting crude cyanuric acid product, after cooling to suitably 125° C., is separated, preferably by centrifuging, whereby all but about 2% of the likuid medium is removed. The oily crude product obtained after separating out the liquid medium is then preferably leached with aqueous ammonia, suitably 0.5 to 2.5% aqueous ammonia at suitably about 90° C. to 100° C. whereby a cyanuric acid solution (e.g. 8% solution) is obtained, which is separated from the insolubles, e.g. by filtration. If desired, the filtrate can be stripped, to recover ammonia therefrom and to reduce cyanuric acid loss in the final mother liquor. After the insolubles have been removed, the solution is at least neutralized by adding acid, and preferably is refluxed. The cyanuric acid precipitates. The cyanuric acid product can be recovered by cooling, filtering, washing, and drying.

The yield of cyanuric acid for the total process based on input urea is usually about 70–75% of theory. The purity of the product can vary between about 96% and 99%, depending in particular upon the treatment of the product during the acidulation step. If care is taken to adhere to all of the preferred conditions specified herein, a 99% pure product can be obtained.

In carrying out the process under preferred conditions, a pool of a hydrocarbon oil with cyanuric acid slurried therein is maintained at about 240° C. under strong agitation maintaining the cyanuric acid as a slurry. The urea is added thereto in molten form at a point well below the surface of the reaction mixture. Feed rates of urea up to about 10 lbs. per cubic foot of reactor space per hour (with liquid occupying ⅔ of the reactor space) have proven to be satisfactory. This corresponds to a residence time within the reactor of about 2.5 hours. At higher feed rates it is difficult to agitate the particles sufficiently to keep the particle size within the desired range. Although low feed rates will yield a satisfactory product, such rates will cut down reactor capacity.

The agitator should be constructed and operated so that a vortex is not created in the reactor; for, if a vortex is created, the urea will have a tendency to concentrate in the vortex and to cake on the stirrer. A material such as Hastelloy C (a corrosion-resistant nickel base alloy) is satisfactory for use an agitator.

Glass is a preferred lining for the reactor. In order to prevent air oxidation of the hydrocarbon used as reaction medium, it is desirable to provide an inert gas blanket within the reactor.

Under our reaction conditions above outlined, shotted particles of the product are formed and tend to increase in size in time. To prevent the formation of particles of undue size, it is preferable to provide an immersion type particle disintegrater within the reactor. It is desirable to so regulate the particle size of the product formed that the particles provide the largest absorbing surface for the urea consistent with ready removal of the liquid medium from the product. The size of the product not only affects the oil retentivity of the product, but also the time it takes in which to separate the product from the liquid medium. For example, when oil slurries of cyanuric acid product of two particular sizes were centrifuged and the oil content of the cake determined, the following results were obtained:

| Maximum Approximate Particle Diameter, Inch | Time of Centrifuging, Minutes | Oil in the Cake, Wt. Percent |
|---|---|---|
| $\frac{1}{64}$ | 25 | 4.6 |
| $\frac{1}{16}$ | 10 | 1.3 |

Preferred particle sizes are in the range of about $\frac{1}{64}$–$\frac{1}{16}$ inch diameter. A vapor scrubber may be provided, connected with the reactor for recovery of any vaporized oil, urea, and ammonium cyanate which may escape from the reaction mixture under the usual pressure used, which is atmospheric pressure. The vapor scrubber is normally a packed column to the top of which molten urea for the reactor is fed. The temperature therein suitably is maintained between about 135° and 140° C. The vaporized oil, urea and ammonium cyanate from the reactor can be fed to the bottom of the column and passed upwardly therethrough, being condensed therein by the scrubbing action of the urea. The materials, so condensed, can then be returned to the reactor along with the molten urea feed. A preferred material for use in the construction of a scrubber vessel of this type is Hastelloy C nickel base alloy.

The separation of the product from the oil is preferably carried out with the aid of an oil centrifuge. Effluent is withdrawn from the reactor and cooled suitably to a temperature of about 125° in a heat exchanger, whereupon it is centrifuged at say about 3000 r.p.m. for 10 minutes, to reduce the oil content to about 2%. It is important that the temperature be maintained above say about 100° C., for at too low temperatures the viscosity of the oils generally used increases and prevents adequate oil drainage.

The oily crude pellets from the centrifuge are then preferably stirred with a 0.5-2.5% aqueous ammonia solution at about 90-100° C. at atmospheric pressure. If the particle diameter of the crude product lies within the preferred range of 1/64 to 1/16 inch, 5 to 10 minutes should be sufficient time to allow for dissolution of the cyanuric acid content of the particles, particularly if the material is agitated. Ammelide by-product and any oil will remain undissolved. The slurry so obtained is fed to a separating means such as a filter wherein the insolubles are removed.

If it is desired to remove ammonia from the resulting filtrate, a stripper may be provided. While this is not essential to the process, it accomplishes a three-fold purpose which may compensate for the cost of heat for evaporation. By the recovery of ammonia, the total ammonia requirement is reduced. Furthermore, the quantity of acid required to acidulate the product is similarly reduced. Finally the reduced volume of mother liquor for discard reduces the cyanuric acid loss.

The filtrate, or the cyanuric acid slurry from the stripper, is then acidulated, preferably at a temperature of about 70-90° C.; and for highest purity the acidulated product is refluxed for at least 1 hour. Preferably sufficient acid is added in excess of the requirement for neutralizing the ammonia to provide, in the case of sulfuric acid, no more than 2 parts by weight of sulfuric acid per part by weight of cyanuric acid. The excess acid tends to reduce the tendency to supersaturation in the mother liquor and furthermore improves the quality of the final product, especially when guanidine in the mother liquor is high. Any of the mineral acids can be used for acidulation.

The cyanuric acid product can be recovered from the acidulated liquor by cooling to e.g. about 30° C. and filtering. The material can be filtered on a Dynel cloth and washed with water. The mother liquor and its wash can be discarded. A second wash containing some ammonia is preferably sprayed on the cake to neutralize any acid which may be present. It is necessary to wash this product uniformly, as unneutralized acid may cause coloring of the product in the subsequent drying step. Since this second wash is ammoniacal, it contains appreciable cyanuric acid and is therefore recycled, suitably to the ammonia dissolution step. The cyanuric acid so obtained can be dried e.g. at temperatures of 120° C. in a forced air drying oven.

When operating in accordance with the above-described process, the product obtained will have a purity of at least 96%. The above step of refluxing the acidulated product for at least 1 hour leads to a final cyanuric acid product of 99% purity.

The following examples set forth specific embodiments of this invention, and illustrate the best mode contemplated by us of carrying out this invention but are not to be interpreted as limiting the invention to all details of the examples.

*Example I*

Thirty-five parts by weight of molten urea and 24.5 parts by weight of mineral oil were fed continuously over a 6.6 hour period to a reactor containing an agitated pool of cyanuric acid and mineral oil heated to 240° C. at atmospheric pressure. The agitated pool initially contained the cyanuric acid and mineral oil in a 1:1 ratio (6.6 lbs. each) and was maintained at a temperature of about 240° C. at atmospheric pressure. Product was continuously withdrawn from the reaction vessel as the molten urea and oil were fed thereto. Volatilized urea and ammonium cyanate were condensed by molten urea flowing down into the reactor through a packed column operated at 135° C. The molten urea and condensate were fed below the surface of the slurry to the reactor wherein an agitator of Hastelloy C nickel base alloy kept the particles in suspension. Air was excluded from the reactor by charging the reactor with $CO_2$, thus preventing oxidation of the oil. The feed rate of the materials was 6.5 lbs./cu. ft. of reactor space per hour. The pool occupied about 2/3 of the reactor space, giving a residence time within the reactor of about 4 hours.

The product withdrawn from the reactor was separated from the oil by centrifuging within the temperature range of 100° to 120° C. The oil recovered therefrom was recycled to the reactor. The product obtained was spherical in shape (1/64" to 1/16" diameter) and contained about 2 weight percent of oil. The product, when analyzed, contained the following material:

| | Wt. percent |
|---|---|
| Cyanuric acid | 75.3 |
| Insolubles | 16.7 |
| Urea | 2.0 |
| Biuret | 0.3 |
| Guanidine | 0.5 |
| Ammonia | 0.4 |
| Oil | 2.0 |
| Other | 2.8 |

The yield of the crude product averaged 72.8% of theory based on the urea fed.

4 parts by weight of the crude product containing 2 weight percent of oil was added with stirring to 35.4 parts by weight of aqueous ammonia solution (1.0 wt. percent) and stirred for about 10 minutes at a temperature of about 90° C. The resulting solution was filtered to remove the insolubles, mainly oil and ammelide. 2.1 parts by weight of 95% sulfuric acid was then added to the filtrate and the solution cooled to a temperature of about 25 to 30° C. The crystallized cyanuric acid was then separated by filtration and washed with 1 part by weight of hot water and with a little aqueous ammonia to neutralize the sulfuric acid. Upon drying, 3.0 parts by weight of cyanuric acid were obtained, which material had the following analysis:

| | Wt. percent |
|---|---|
| Cyanuric acid | 96.9 |
| Insolubles | <0.1 |
| Urea | <0.1 |
| Biuret | <0.1 |
| Guanidine | <0.1 |
| Ammonia | <0.1 |
| Water | 0.2 |
| Other | 2.4 |
| Oil | Trace |

*Example II*

4.8 parts by weight of the crude cyanuric acid obtained in the manner described for Example I and 0.2 parts by weight of Hyflo Super-Cel, a filter aid, were added with stirring to 39.5 parts by weight of aqueous ammonia solution (1.0 wt. percent) and stirred for 10 minutes at about 90° C. The resulting solution was filtered to remove the insolubles, which consisted mainly of the Hyflo Super-Cel filter aid, oil, and ammelide.

2.0 parts by weight of 95% sulfuric acid was then added to the slurry and stirred. The material was then heated at reflux temperature for about 2 hours and then cooled to a temperature of about 30° C. The crystallized cyanuric acid was then separated from the mother liquor by filtration and washed with 1 part by weight of water and a little aqueous ammonia to neutralize the sulfuric acid. Upon drying, 3.5 parts by weight of white cyanuric acid was obtained which analyzed as follows:

| | Wt. percent |
|---|---|
| Cyanuric acid | 99+ |
| Insolubles | 0.3–0.4 |
| Water | 0.2 |

The cyanuric acid prepared in accordance with the method of Example II can readily be used in the preparation of chloroisocyanuric acids. The following is an example of the manner in which this cyanuric acid has been chlorinated.

14.9 parts by weight of cyanuric acid was placed in a reactor along with 16.5 parts by weight of sodium hydroxide and 3 parts by weight of water. The resultant solution was cooled to 5° C. in a reactor provided with a stirrer and a means for introducing chlorine. Gaseous chlorine was then added at a rate to maintain a temperature within the reactor of 5° to 10° C. The chlorination was considered to be complete when the reaction temperature dropped below 5° C. The white solid trichloroisocyanuric acid obtained in this manner was recovered by filtration, washed several times with ice water, and dried at 60° C. and 18 mm. pressure for two hours. The yield obtained was 23 parts by weight. Two samples of cyanuric acid of different purity, after chlorination as above, were analyzed for total chlorine, yielding the following analysis:

| Purity of Initial sample (Percent cyanuric Acid) | Percent Cl in Chlorinated Product | Percent Cl (Theory for Trichlorocyanuric Acid) |
|---|---|---|
| 93.7 | 43.6 | 45.8 |
| 99+ | 45.7 | 45.8 |

While sulfuric acid was used in the above examples, it should be understood that hydrochloric and nitric acid will serve equally well.

Although certain preferred embodiments of the invention have been disclosed for purposes of illustration, it will be evident that various changes and modifications may be made therein without departing from the scope and spirit of the invention.

We claim:
1. The method of preparing cyanuric acid which comprises feeding molten urea into an agitated inert liquid medium which at all times contains 0.5 to 1.5 parts of slurried cyanuric acid per part of liquid medium; maintaining a temperature between about 200° and about 300° C. in the slurry; recovering crude cyanuric acid from the resulting reaction product; leaching the crude cyanuric acid with hot dilute aqueous ammonia to dissolve the cyanuric acid; removing insolubles from the resulting hot solution; adding a mineral acid to the hot solution to at least neutralize it; cooling the so-treated product to precipitate cyanuric acid; and separating the cyanuric acid from the mother liquor.

2. Method of preparing cyanuric acid as defined in claim 1 which comprises leaching the crude cyanuric acid with a hot 0.5 to 2.5% aqueous ammonia solution at about 90° C. to 100° C. to dissolve the cyanuric acid; removing insolubles and acidulating as in claim 1; and heating the acidulated product at reflux temperatures; then cooling and separating cyanuric acid product.

3. Method of preparing cyanuric acid as defined in claim 2 which comprises adding sufficient sulfuric acid in the acidulation step to neutralize the ammonia used and provide an excess of no more than about 2 parts by weight of sulfuric acid per part by weight of cyanuric acid, and heating the acidulated product at reflux temperatures for at least about 1 hour.

4. In the process of preparing pure cyanuric acid, the steps comprising leaching crude cyanuric acid with an aqueous ammonia solution to dissolve cyanuric acid; removing insolubles from the resulting solution; adding a mineral acid to the solution to at least neutralize it; heating the acidulated product at reflux temperatures; cooling the so-treated product to precipitate cyanuric acid; and separating the cyanuric acid from the mother liquor.

5. In the process of preparing pure cyanuric acid, the steps comprising leaching crude cyanuric acid with a 0.5–2.5% aqueous ammonia solution at about 90° C. to 100° C. to dissolve cyanuric acid; removing insolubles therefrom; adding sufficient sulfuric acid to the remaining liquor to neutralize the ammonia used and provide an excess of no more than 2 parts by weight sulfuric acid per part by weight of cyanuric acid; heating the acidulated product at reflux temperatures for at least about 1 hour; cooling the so-treated product to precipitate cyanuric acid; and separating the cyanuric acid from the mother liquor.

References Cited in the file of this patent

UNITED STATES PATENTS

| 2,527,316 | Mackay | Oct. 24, 1950 |
| 2,729,637 | Gable et al. | Jan. 3, 1956 |
| 2,822,363 | Christmann et al. | Feb. 4, 1958 |
| 2,872,447 | Oehlschlager | Feb. 3, 1959 |
| 2,943,088 | Westfall | Jan. 28, 1960 |
| 2,952,679 | Perret | Sept. 13, 1960 |
| 2,975,177 | Christmann | Mar. 14, 1961 |

FOREIGN PATENTS

| 506,070 | Canada | Sept. 28, 1954 |
| 561,426 | Belgium | Apr. 5, 1958 |

OTHER REFERENCES

Hofmann: "Deutsche Chemische Gesellschaft Berichte," vol. 4, pages 262, 269 (1871).